United States Patent Office 3,171,836
Patented Mar. 2, 1965

3,171,836
2,4,7-TRIAMINO-N-(SUBSTITUTED)-6-PTERIDINECARBOXAMIDES
Thomas S. Osdene, West Chester, Pa., assignor to American Home Products Corporation, New York, N.Y., a corporation of Delaware
No Drawing. Filed Nov. 2, 1962, Ser. No. 235,142
7 Claims. (Cl. 260—247.2)

This invention is concerned with novel 6-pteridinecarboxamides and with processes for making the same. More particularly, this invention relates to 2,4,7-triamino-N-(substituted)-6-pteridinecarboxamides and in particular to compounds defined by the following general formula:

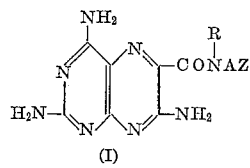

wherein R is selected from the group consisting of hydrogen and lower alkyl; A is a straight chain or branched chain alkylene radical having from 2 to 5 carbon atoms; while Z is selected from the group consisting of dialkylamino, in which the alkyl groups may be the same or different and preferably contain a total of from 1 to 8 carbon atoms in the chain, or chains and the pyrrolidinyl, piperazinyl, and morpholinyl radicals.

The compounds sought to be patented exhibit antiviral and anti-inflammatory properties.

A preferred synthesis for preparing compounds having Formula I, above, consists in reacting, in an anhydrous neutral polar solvent in the presence of a basic catalyst, a 2-cyano-N-substituted-acetamide (III) with 2,4,6-triamino-5-nitrosopyrimidine (II).

The reaction mixture is agitated and heated to between 50° C. and 200° C.; and preferably is refluxed at the boiling temperature of the selected inert solvent. The reaction time for this reaction usually ranges from about 1 to about 4 hours. At the completion of the reaction, the solvent is removed and the residue is treated with hot water to remove unreacted 2,4,6-triamino-5-nitrosopyrimidine.

The product can be recrystallized from a suitable solvent such as ethanol, aqueous dimethylformamide, or from water.

Inert solvents suitable for the synthesis of the compounds sought to be patented include methanol, ethanol, 2-ethoxyethanol, methoxy and ethoxypropanols, dimethylformamide, diethylformamide and dimethylacetamide.

Suitable basic catalysts include the alkali metals, their alkoxides and their alkoxyalkoxides. Preferred among these are sodium metal, sodium methoxide and sodium α-ethoxy alkoxide.

The above-described reaction may be illustrated graphically as follows:

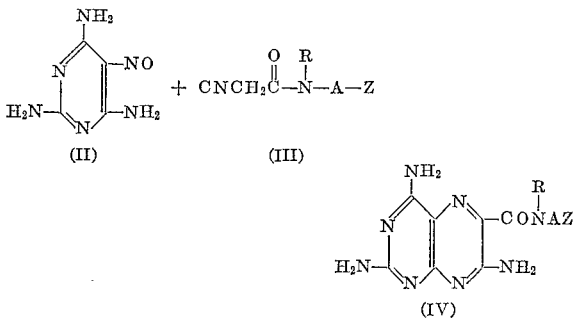

where the substituents are as above-defined.

The invention is specifically illustrated by the following examples, in which all the temperatures are given in degrees centigrade.

Example 1

To a solution of 0.2 g. of sodium metal in 500 ml. of dried 2-ethoxyethanol was added 4.62 g. of 2,4,6-triamino-5-nitrosopyrimidine followed by 6.0 g. of 2-cyano-N-(2-diethylaminoethyl)acetamide. The mixture was stirred mechanically and boiled under a reflux condenser for four hours and was then allowed to stand overnight. The solvent was removed on a rotary evaporator and an orange colored precipitate was obtained, wt.=9.0 g., M.P. 278° d. This precipitate was extracted twice with boiling water to remove any unchanged pyrimidine derivative and yielded a material, having a melting point of 308°. Recrystallization from aqueous dimethylformamide afforded 2,4,7-triamino-N-(2-diethylaminoethyl)-6-pteridinecarboxamide, M.P. 311–312°. A sample recrystallized from water gave the following analysis for the hemihydrate.

*Analysis.*—Calculated: C, 47.55; H, 6.75; N, 38.39. Found: C, 47.82; H, 7.02; N, 38.30.

Example 2

To a solution of 0.2 g. of sodium in 450 ml. of dry 2-ethoxyethanol was added 4.62 g. of 2,4,6-triamino-5-nitrosopyrimidine, followed by 5.5 g. of 2-cyano-N-(3-dimethylaminopropyl)acetamide. The mixture was boiled under reflux for two hours and after filtration the solution was concentrated to small bulk and 100 m. of water was added to the warm solution. The red unchanged starting material was rapidly removed by filtration, and the filtrate deposited a brown crystalline material. Several fractional crystallizations from water yielded 2,4,7-triamino-N - (3 - dimethylaminopropyl) - 6-pteridinecarboxamide, hemihydrate, M.P. 284–285°.

*Analysis.*—Calculated: C, 45.85; H, 6.41; N, 40.11. Found: C, 46.13; H, 6.43; N, 40.22.

Example 3

To a solution of 1.0 g. of sodium metal in 500 ml. of dry-2-ethoxyethanol was added 6.16 g. of 2,4,6-triamino-5-nitrosopyrimidine and the mixture was stirred mechanically and boiled under reflux. Following this, 8.5 g. of 2-cyano-N-(3-diethylaminopropyl)acetamide was added, and the whole was boiled for one hour. The solvent was then removed on a rotary evaporator and the residue was treated with 150 ml. of water. A crystalline precipitate was deposited, which after cooling was removed by filtration, wt.=9.8 g., M.P. 310°. Recrystallization from aqueous dimethylformamide afforded 2,4,7-triamino-N-(3-diethylaminopropyl) - 6 - pteridinecarboxamide, M.P. 317°.

*Analysis.*—Calculated: C, 50.43; H, 6.95; N, 37.81. Found: C, 50.01; H, 7.23; N, 37.94.

Example 4

To a solution of 1.0 g. of sodium metal in 500 ml. of dry 2-ethoxyethanol was added 6.16 g. of 2,4,6-triamino-5-nitrosopyrimidine and the mixture was boiled for five minutes. To this solution was added 8.4 g. of 2-cyano-N-(2-morpholinoethyl)-acetamide and the whole was stirred and boiled under reflux for one hour. The solvent was removed on a rotary evaporator, and the residue was treated with 150 ml. of water whereupon a precipitate deposited. Several recrystallizations from aqueous dimethylformamide afforded 2,4,7-triamino-N-(2-morpholinoethyl)-6-pteridinecarboxamide, M.P. 294°.

*Analysis.*—Calculated: C, 46.84; H, 5.75; N, 37.82. Found: C, 46.67; H, 5.93; N, 37.81.

The following 2,4,7-triaminopteridine derivatives may also be prepared by the reaction of 2,4,6-triamino-5-nitrosopyrimidine, with the appropriate cyano-acetamide derivative.

Example 5

2,4,7-triamino-N-(2 - dimethylaminoethyl)-6-pteridinecarboxamide is prepared from 5.71 g. of 2-cyano-N-(2-dimethylaminoethyl)acetamide, and 4.62 g. of 2,4,6-triamino-5-nitrosopyrimidine according to the procedure of Examples 1-4.

Example 6

2,4,7 - triamino-N-(ethyl - 2 - dimethylaminoethyl)-6-pteridinecarboxamide is prepared from 6.0 g. of 2-cyano-N-(ethyl-2-dimethylaminoethyl)acetamide, and 4.62 g. of 2,4,6-triamino-5-nitrosopyrimidine according to the procedure of Examples 1-4.

Example 7

2,4,7 - triamino-N-(2 - diisopropylaminoethyl)-6-pteridinecarboxamide is prepared from 6.96 g. of 2-cyano-N-(2-diisopropylaminoethyl)acetamide and 4.62 g. of 2,4,6-triamino-5-nitrosopyrimidine according to the procedure of Examples 1-4.

Example 8

2,4,7 - triamino-N-(3 - di-n-butylaminopropyl)-6-pteridinecarboxamide is prepared from 8.35 g. of 2-cyano-N-(3-di-n-butylaminopropyl)acetamide and 4.62 g. of 2,4,6-triamino-5-nitrosopyrimidine according to the procedure of Examples 1-4.

Example 9

2,4,7-triamino-N-(2 - pyrrolidinoethyl)-6-pteridinecarboxamide is prepared from 6.0 g. of 2-cyano-N-(2-pyrrolidinoethyl)acetamide and 4.62 g. of 2,4,6-triamino-5-nitrosopyrimidine according to the procedure of Examples 1-4.

Example 10

2,4,7-triamino-N-(4 - dimethylaminobutyl)-6-pteridinecarboxamide is prepared from 6.0 g. of 2-cyano-N-(4-dimethylaminobutyl)acetamide and 4.62 g. of 2,4,6-triamino-5-nitrosopyrimidine according to the procedure of Examples 1-4.

Example 11

2,4,7 - triamino-N-(2 - piperidinoethyl)-6-pteridinecarboxamide is prepared from 6.44 g. of 2-cyano-N-(2-piperidinoethyl)acetamide and 4.62 g. of 2,4,6-triamino-5-nitrosopyrimidine according to the procedure of Examples 1-4.

Example 12

2,4,7 - triamino-N-(3 - morpholinopropyl)-6-pteridinecarboxamide is prepared from 7.0 g. of 2-cyano-N-(3-morpholinopropy)acetamide and 4.62 g. of 2,4,6-triamino-5-nitrosopyrimidine according to the procedure of Examples 1-4.

Example 13

2,4,7 - triamino-N-(2 - dimethylaminopropyl)-6-pteridinecarboxamide is prepared from 5.5 g. of 2-cyano-N-(2-dimethylaminopropyl)acetamide and 4.62 g. of 2,4,6-triamino-5-nitrosopyrimidine according to the procedure of Examples 1-4.

The compounds sought to be patented can be administered in the usual pharmaceutical forms, such as tablets, capsules, syrups, pills and the like. Obviously, they can be combined with various solid and liquid carriers and inert ingredients to prepare the pharmaceutical preparation for oral or parenteral administration.

Various changes and modifications of this invention can be made by those skilled in the art to which it relates, and, to the extent that such variations incorporate the spirit of the invention, they are included within the scope of the claims.

What is claimed is:
1. A compound of the formula:

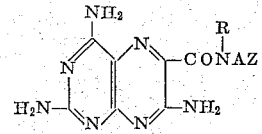

wherein R is selected from the group consisting of hydrogen and lower alkyl; A is an unsubstituted alkylene radical having from 2 to 5 carbon atoms; and Z is selected from the group consisting of di(lower)alkylamino, pyrolidino, piperidino and morpholino.

2. 2,4,7 - triamino- N -(2 - diethylaminoethyl)-6-pteridinecarboxamide.

3. 2,4,7 - triamino-N-(3-dimethylaminopropyl)-6-pteridinecarboxamide.

4. 2,4,7 - triamino-N(3 - diethylaminopropyl)-6-pteridinecarboxamine.

5. 2,4,7-triamino-N-(2 - morpholinoethyl)-6-pteridinecarboxamide.

6. 2,4,7-triamino-N-(2 - diethylaminoethyl)-6-pteridinecarboxamide, hemihydrate.

7. 2,4,7-triamino-N-(3 - dimethylaminopropyl)-6-pteridinecarboxamide, hemihydrate.

References Cited in the file of this patent

UNITED STATES PATENTS

| | | |
|---|---|---|
| 2,963,478 | Weinstock | Dec. 6, 1960 |
| 2,975,180 | Osdene | Mar. 14, 1961 |

OTHER REFERENCES

Osdene et al.: "J. Chem. Soc.," Part II, pages 2036-8 (1955).